(12) United States Patent
Weickert et al.

(10) Patent No.: US 9,828,186 B2
(45) Date of Patent: Nov. 28, 2017

(54) ADJUSTABLE GUIDE RAIL SYSTEM FOR CONVEYORS

(71) Applicant: Nercon Eng. & Mfg., Inc., Neenah, WI (US)

(72) Inventors: Michael Weickert, Oshkosh, WI (US);
Daniel Bickel, Oconto, WI (US);
Jeffrey Falash, Suring, WI (US);
Andrew Rottier, Green Bay, WI (US)

(73) Assignee: Nercon Eng. & Mfg., Inc., Neenah, WI (US)

( * ) Notice: Subject to any disclaimer, the term of this patent is extended or adjusted under 35 U.S.C. 154(b) by 0 days.

(21) Appl. No.: 14/828,401

(22) Filed: Aug. 17, 2015

(65) Prior Publication Data
US 2017/0066596 A1  Mar. 9, 2017

Related U.S. Application Data

(60) Provisional application No. 62/037,717, filed on Aug. 15, 2014.

(51) Int. Cl.
*B65G 21/20* (2006.01)

(52) U.S. Cl.
CPC ................. *B65G 21/2072* (2013.01)

(58) Field of Classification Search
CPC . B65G 21/20; B65G 21/2045; B65G 21/2072
USPC ........................................ 198/836.3
See application file for complete search history.

(56) References Cited

U.S. PATENT DOCUMENTS

| | | | | |
|---|---|---|---|---|
| 4,216,855 A * | 8/1980 | Raudat | ................. | B65B 21/04 |
| | | | | 198/836.3 |
| 5,211,280 A * | 5/1993 | Houde | ............... | B65G 21/2072 |
| | | | | 198/836.3 |
| 6,612,785 B1 * | 9/2003 | Ouellette | ............ | B65G 51/035 |
| | | | | 198/836.3 |
| 8,464,864 B2 * | 6/2013 | Bell | .................. | B65G 21/2072 |
| | | | | 198/836.3 |
| 9,073,698 B2 * | 7/2015 | Huettner | ........... | B65G 21/2063 |
| 2011/0079493 A1 * | 4/2011 | Bell | .................. | B65G 21/2072 |
| | | | | 198/836.3 |

* cited by examiner

*Primary Examiner* — James R Bidwell
(74) *Attorney, Agent, or Firm* — Nicholas A. Kees; Godfrey & Kahn, S.C.

(57) ABSTRACT

A guide rail system for guiding containers moved by a conveyor defining a path with a straight or curved segment. The guide rail system is adjustable such that by engaging a single mechanism, the distance between a pair of rails (one rail on each side of the conveyor) is changed across multiple conveyor segments (straight and/or curved). The invention provides an adjustable guide rail system for use in connection with a conveying surface capable of moving with respect to the guide rail system.

11 Claims, 18 Drawing Sheets

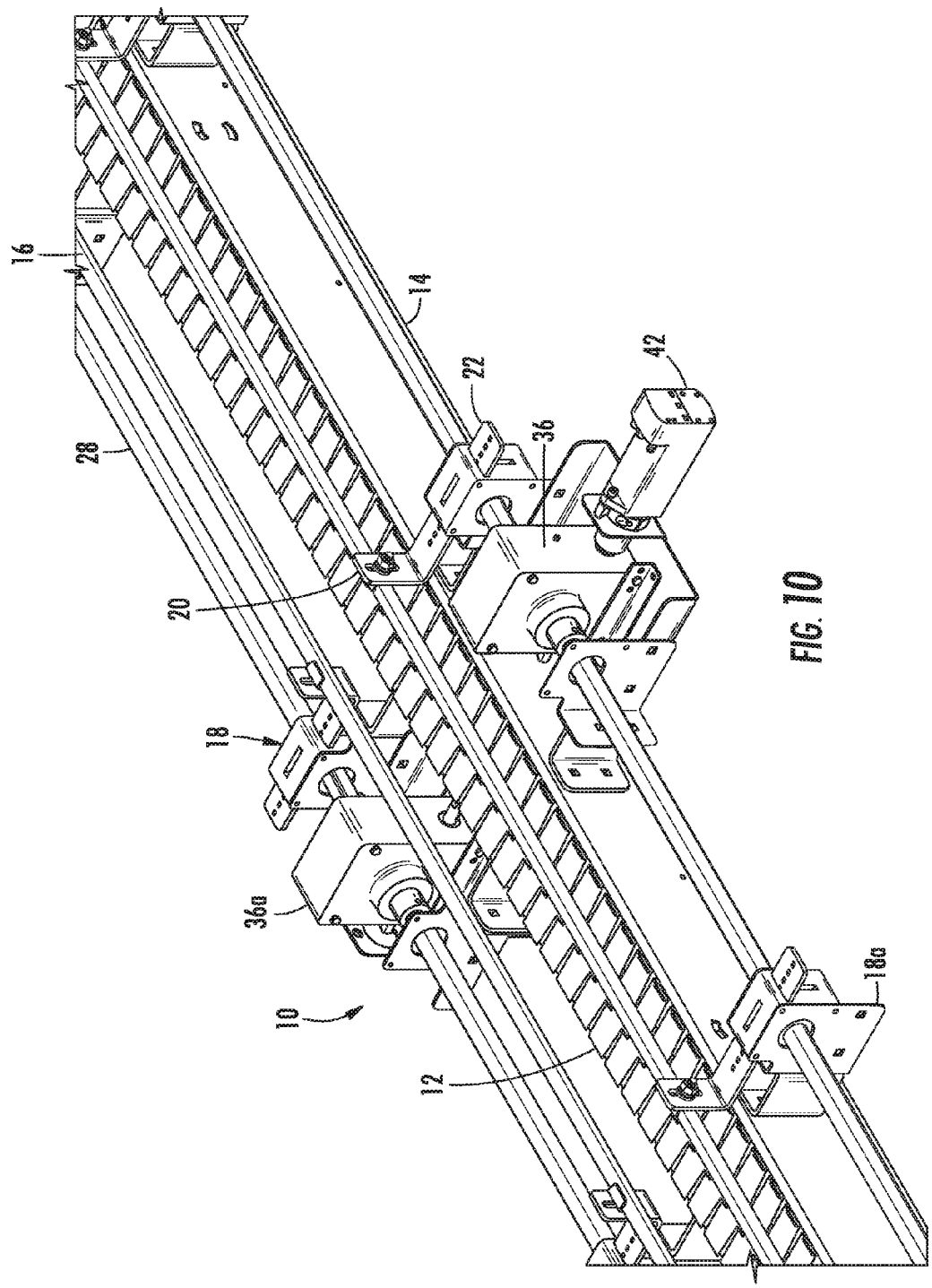

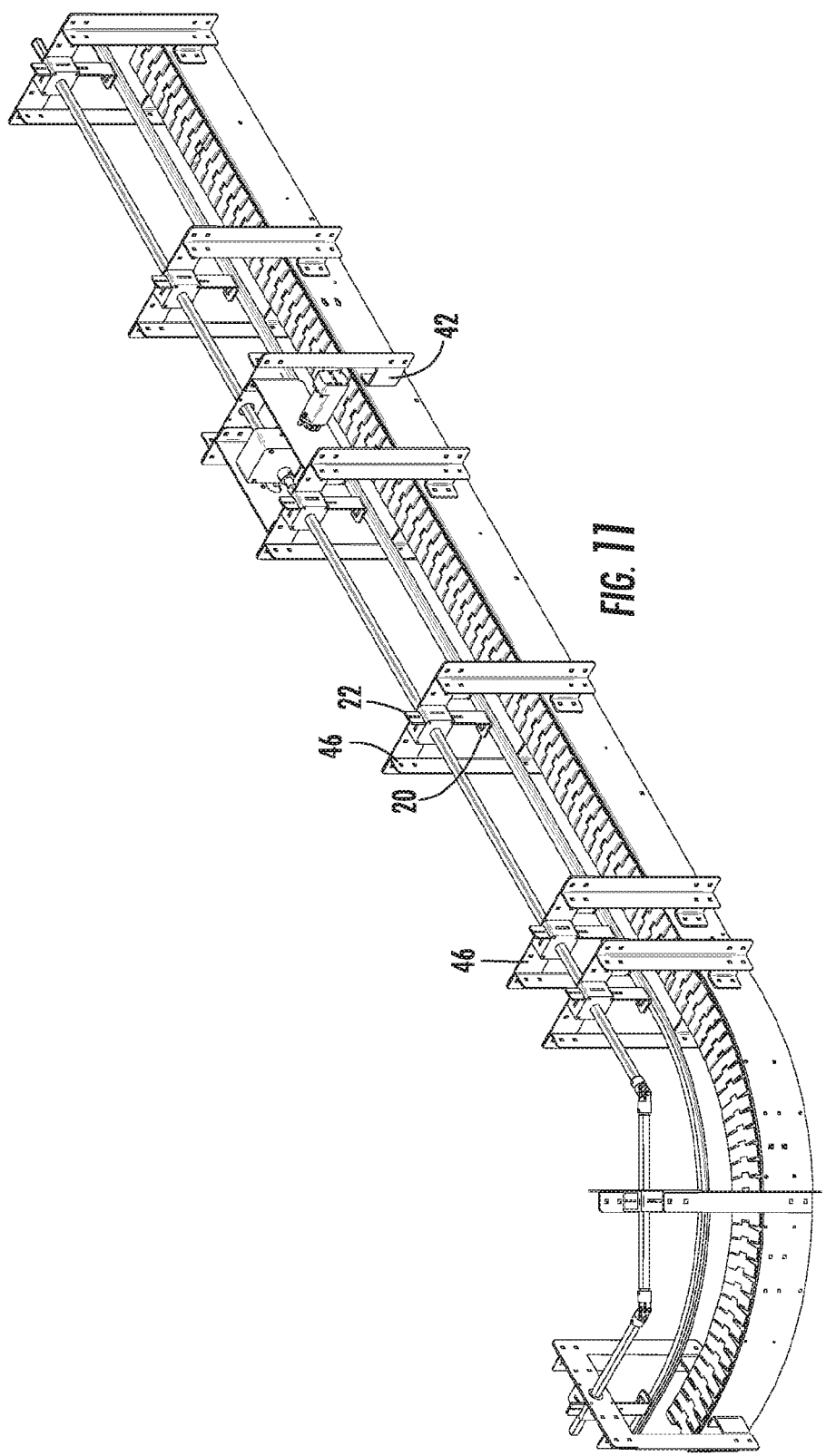

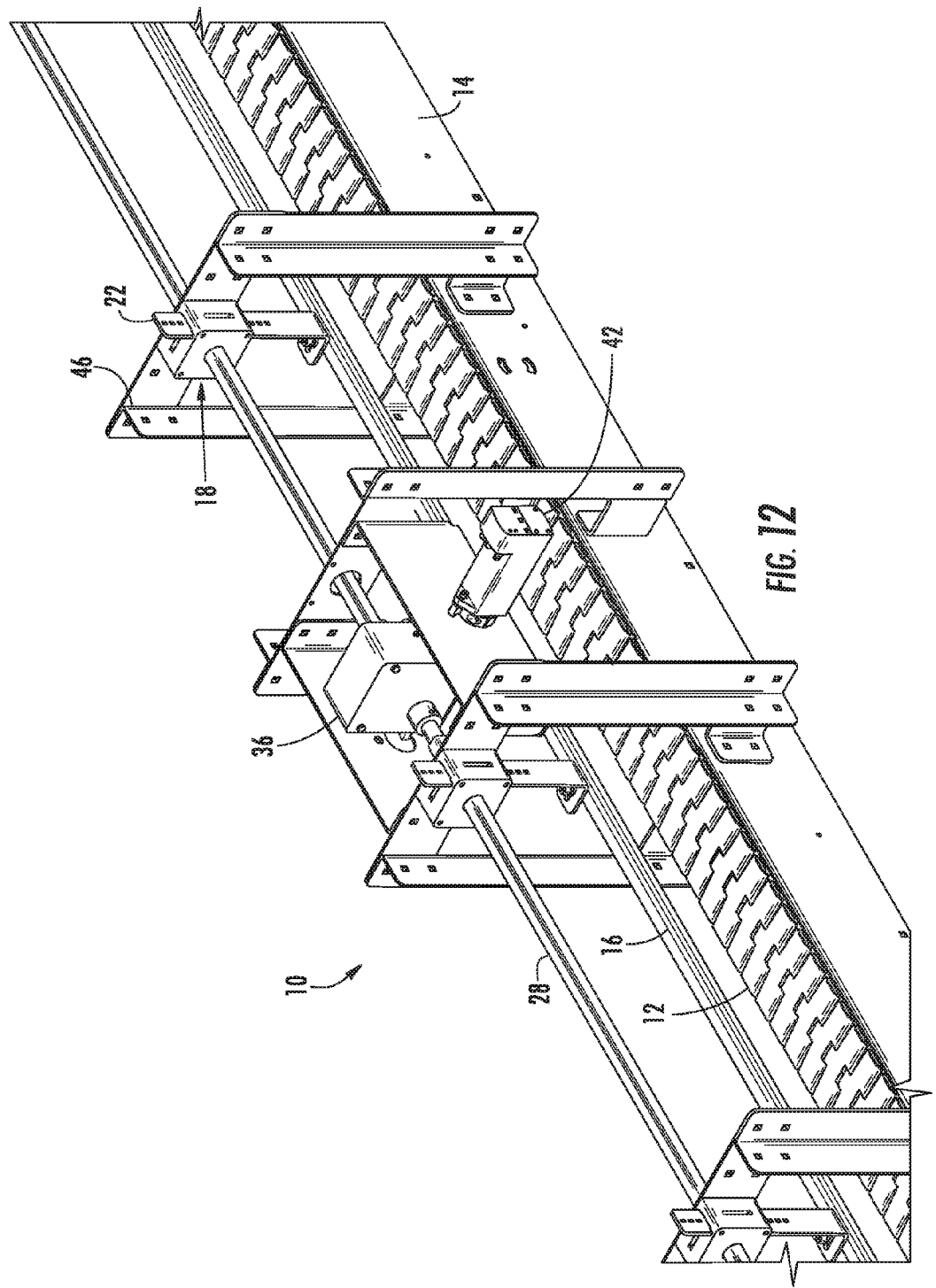

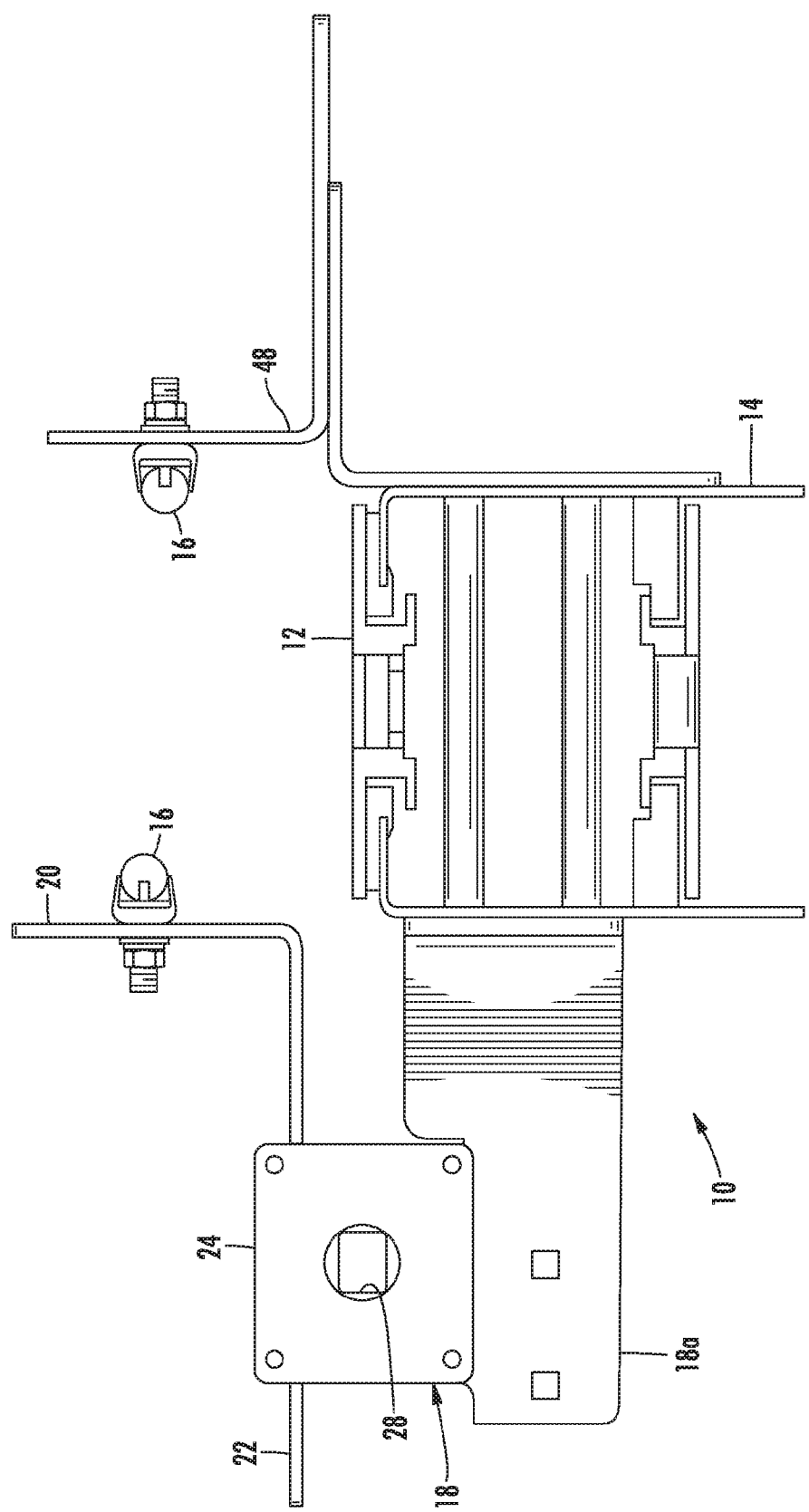

ADJUSTABLE GUIDE RAIL SYSTEM FOR CONVEYORS

CROSS REFERENCE TO RELATED APPLICATION

This application claims the benefit of U.S. Provisional Patent Application Ser. No. 62/037,717, filed on Aug. 15, 2014. All information disclosed in that application is incorporated herein by reference.

BACKGROUND OF THE INVENTION

The present invention relates generally to the field of conveyors, and specifically to guide rail systems for guiding items moved by a conveyor defining a path with a straight or curved segment, and including equipment connected to such conveyors, as found in modern assembly, such as rinsers, fillers, cartoners, and case packers, to guide product into and out of such machines.

It is common for conveyors to need some type of guide rails alongside the conveying surface, so as to keep the items being conveyed from falling off the conveyor, or even just to keep the items upright and not falling over on the conveying surface, which could cause not only damage to the items being conveyed, but also jamming of the conveyor or the items being conveyed. It is desirable to be able to adjust the spacing between the guides, so as to accommodate different types and sizes of items to be conveyed. There have been prior systems where the spacing of the guides has been adjustable. But there is a need for simpler and quicker adjustments of the spacing.

The present invention relates to improvements over the apparatus described above and to solutions to some of the problems raised or not solved thereby.

SUMMARY OF THE INVENTION

The invention provides a guide rail system that is adjustable such that by engaging a single mechanism, the distance between a pair of rails (one rail on each side of the conveyor) is changed across multiple conveyor segments (straight and/or curved). The adjustable guide rail system is for use in connection with a conveying surface capable of moving with respect to the guide rail system. The guide rail system includes a guide rail positioned alongside the conveying surface. A guide rail support system is connected to the guide rail, the guide rail support system including a plurality of guide rail adjustment assemblies. Each guide rail adjustment assembly has a guide rail arm, to which the guide rail is mounted. The guide rail arm has an adjustment rack, and a guide rail pinion engaged with the adjustment rack and positioned such that a rotation of the guide rail pinion causes the adjustment rack, and consequently the guide rail arm and in turn the guide rail itself, to move generally linearly, closer to and further away from the center of the conveying surface. The guide rail support system further includes a synchronizing connector connected to the guide rail pinions of two guide rail adjustment assemblies. A rotator is connected to the synchronizing connector for rotating the synchronizing connector and thereby rotating the connected guide rail pinions.

Other objects and advantages of the invention will become apparent hereinafter.

DESCRIPTION OF THE DRAWING

FIG. 10 is a perspective view of a portion of a conveyor constructed according to an alternative embodiment of the invention.

FIG. 11 is a perspective view of a portion of a conveyor constructed according to another alternative embodiment of the invention.

FIG. 12 is an enlarged perspective view of a section of the conveyor shown in FIG. 11.

FIG. 13 is a cross sectional view of a conveyor constructed according to another alternative embodiment of the invention, wherein only one side of the guide rail is adjustable.

DETAILED DESCRIPTION

Figure 1:
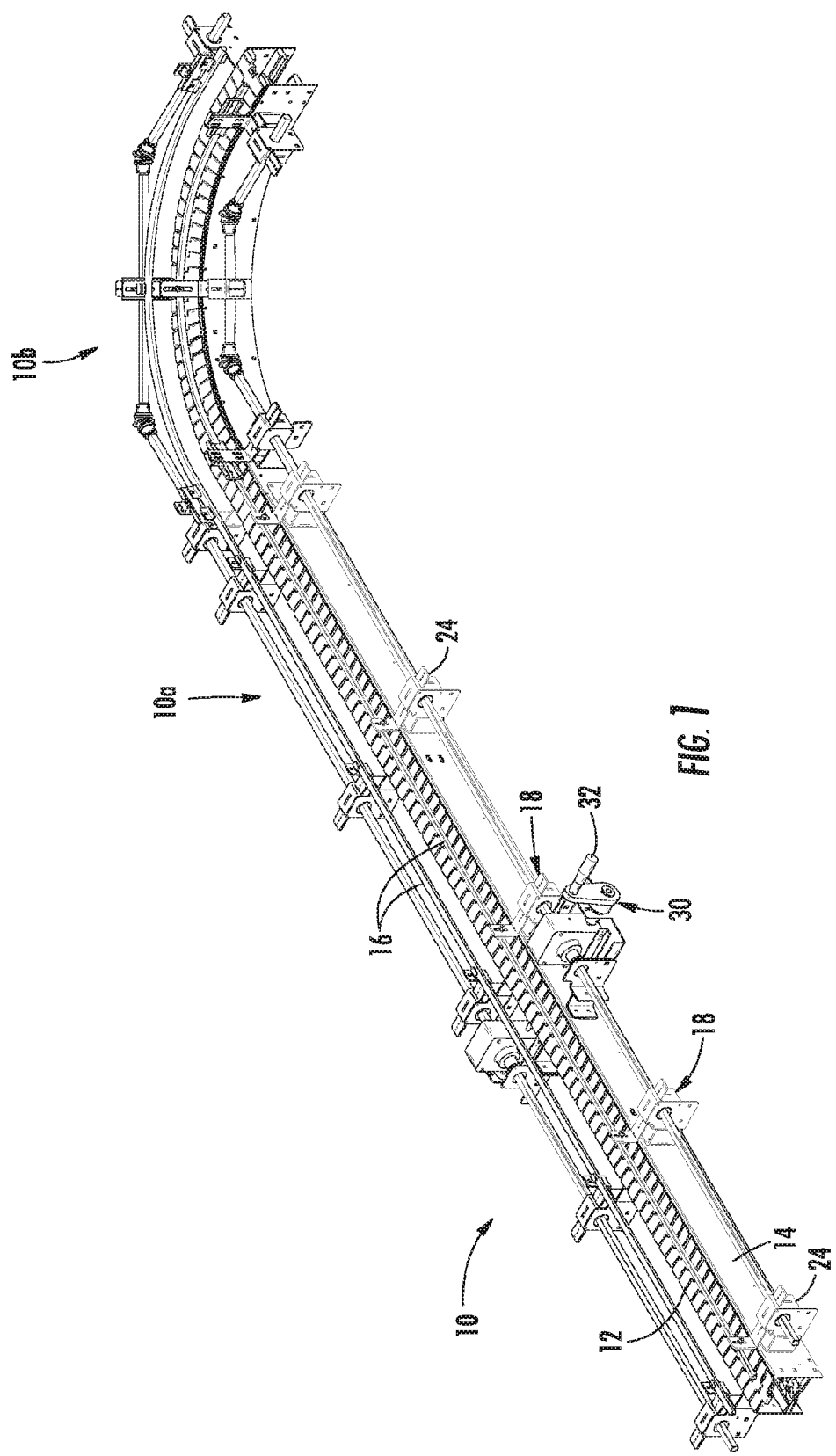
FIG. 1 is a perspective view of a conveyor having an adjustable guide rail according to one embodiment of the invention.

Referring now to FIG. 1, a conveyor 10 is generally shown, having a conveying surface 12 for conveying various items (not shown). The conveying surface 12 is supported on a frame 14, and is capable of moving along the frame, by means of a conveyor motor (not shown) as is conventional and well known.

According to the invention, as shown in FIGS. 1-4, a guide rail 16 is positioned along at least one side of the conveying surface 12. In the embodiment shown there, there are two guide rails 16, one positioned along each side of the conveying surface 12, substantially along the entire length of the conveyor 10. The invention provides for a guide rail support system, for supporting the guide rail 16 with respect to the conveying surface 12. As will be explained below with respect to different embodiments of the invention, the guide rails 16 may be positioned at the side of the conveying surface, or over the conveying surface 12, so as to guide the items with respect to a portion of the conveying surface, such as the center of the conveying surface.

Figure 5:
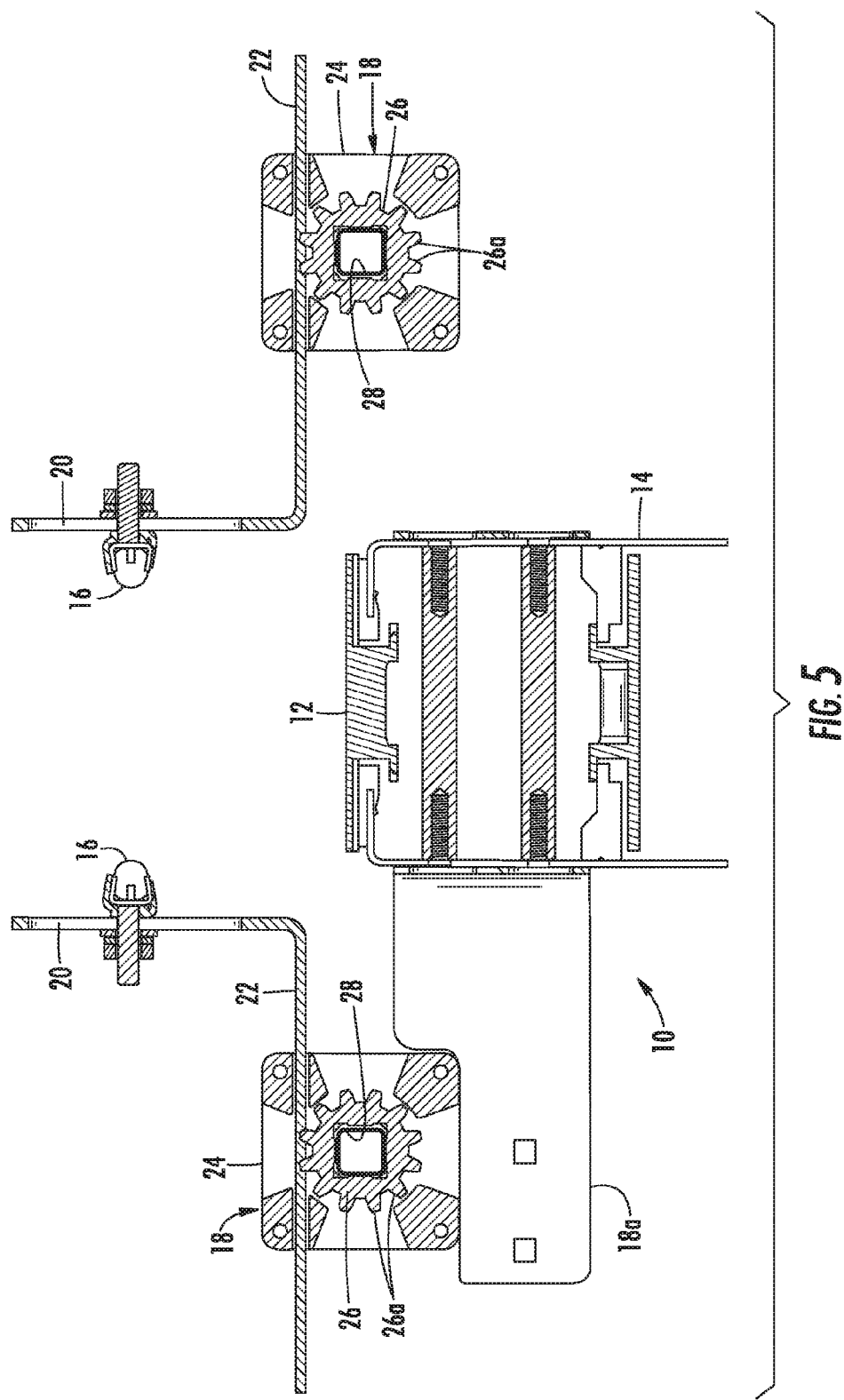
FIG. 5 is a cross sectional view of the conveyor shown in FIG. 3, taken along line 5-5.

As part of the guide rail support system, at certain spaced-apart locations along the conveyor 10 are positioned guide rail adjustment assemblies 18. Each guide rail adjustment assembly 18 includes a guide rail arm 20 which is attached to and supports the portion of the guide rail 16 in the vicinity of the guide rail arm. Each guide rail arm 20 also has an adjustment rack 22, which is shown integrally formed with the respective guide rail arm 20, but which could also be formed as a separate item and assembled to the guide rail arm. Each adjustment rack 22 passes into a respective pinion block 24 to engage with a pinion gear or pinion 26, shown in FIG. 5. Each pinion block 24 is mounted to the frame 14 by means of pinion block mounting brackets 18a. While the means of engagement between the pinion 26 and the adjustment rack 22 is shown to be pinion teeth 26a engaging with openings 22a formed for that purpose in the adjustment rack, any other suitably accurate and repeatable engagement between those two elements is also contemplated by the invention, including for example other gearing such as bevel gearing. The pinion block 24 and adjustment rack 22 are positioned and arranged so that, when pinion 26 is rotated in one direction, the guide rail arm 20, and the respective portion of the guide rail 16, is moved closer to the selected or desired area of conveying surface 12, whereas when pinion 26 is rotated in the opposite direction, the guide rail arm 20, and the respective portion of the guide rail 16 in the vicinity of the guide rail arm, is moved further away from the desired area of conveying surface 12.

The invention further provides a synchronizing connector 28 connecting the respective pinions 26 of each pair of adjacent pinion blocks 24 on one side of the conveyor 10, such that when one synchronizing connector 28 is rotated, the pinions 26 of each pair of adjacent pinion blocks 24 is rotated. Thus, when one synchronizing connector 28 is rotated, all the pinions 26 in all the pinion blocks 24 are rotated, thereby moving all the guide rail arms 20, in turn moving the entire guide rail 16 on that side of the conveyor 10. The synchronizing connector 28 shown in the drawing figures has a substantially square cross section. Synchronizing connectors with other cross sections could also be used, including rectangular, or oval. Even a round cross section could be used, but that would require the inclusion of a set collar or some other structure to connect the synchronizing connector to the respective pinions so as to pass on the torsional forces supplied by the synchronizing connectors.

Figure 2:
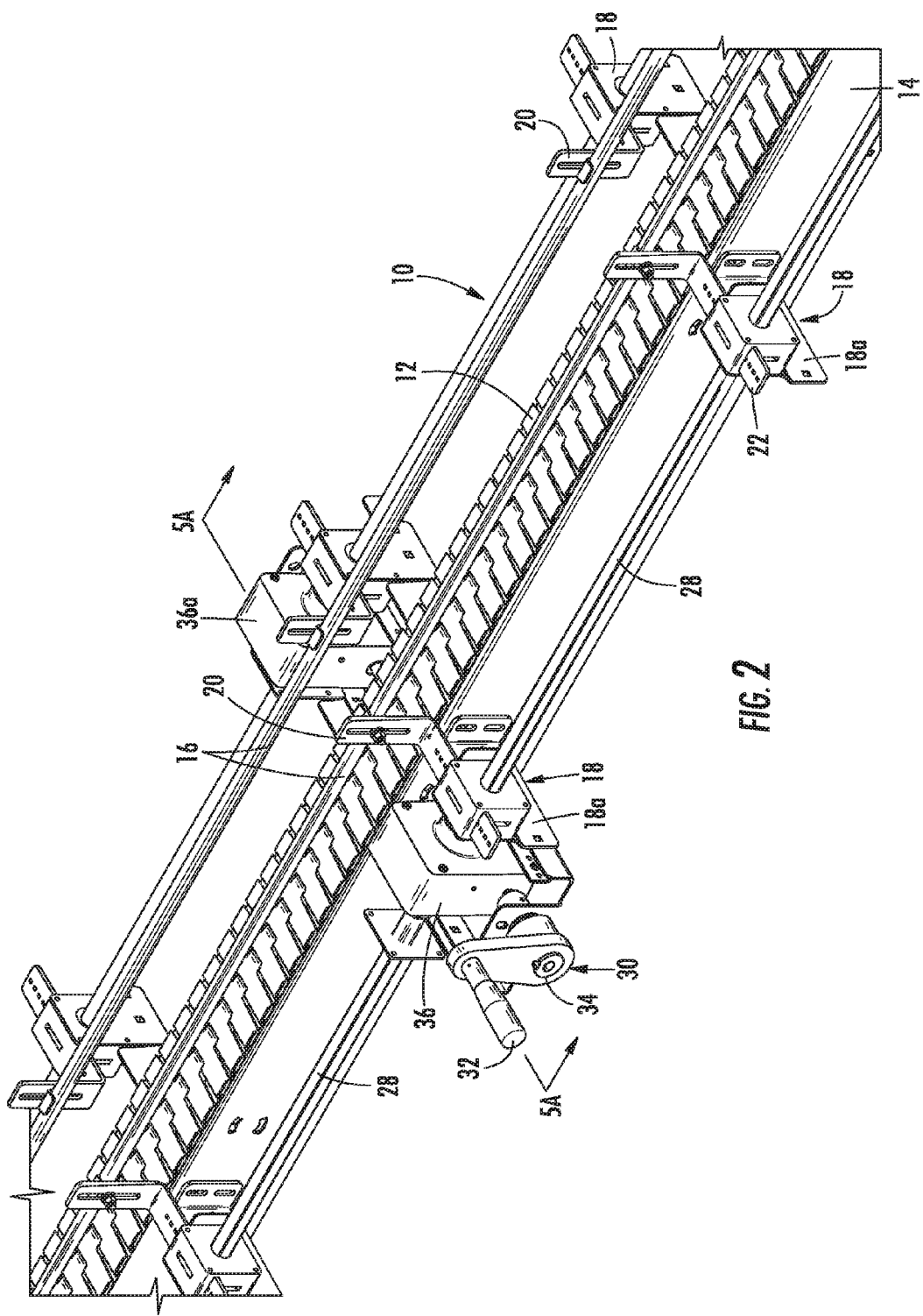
FIG. 2 is an enlarged perspective view of a straight section of the conveyor shown in FIG. 1.
Figure 3:
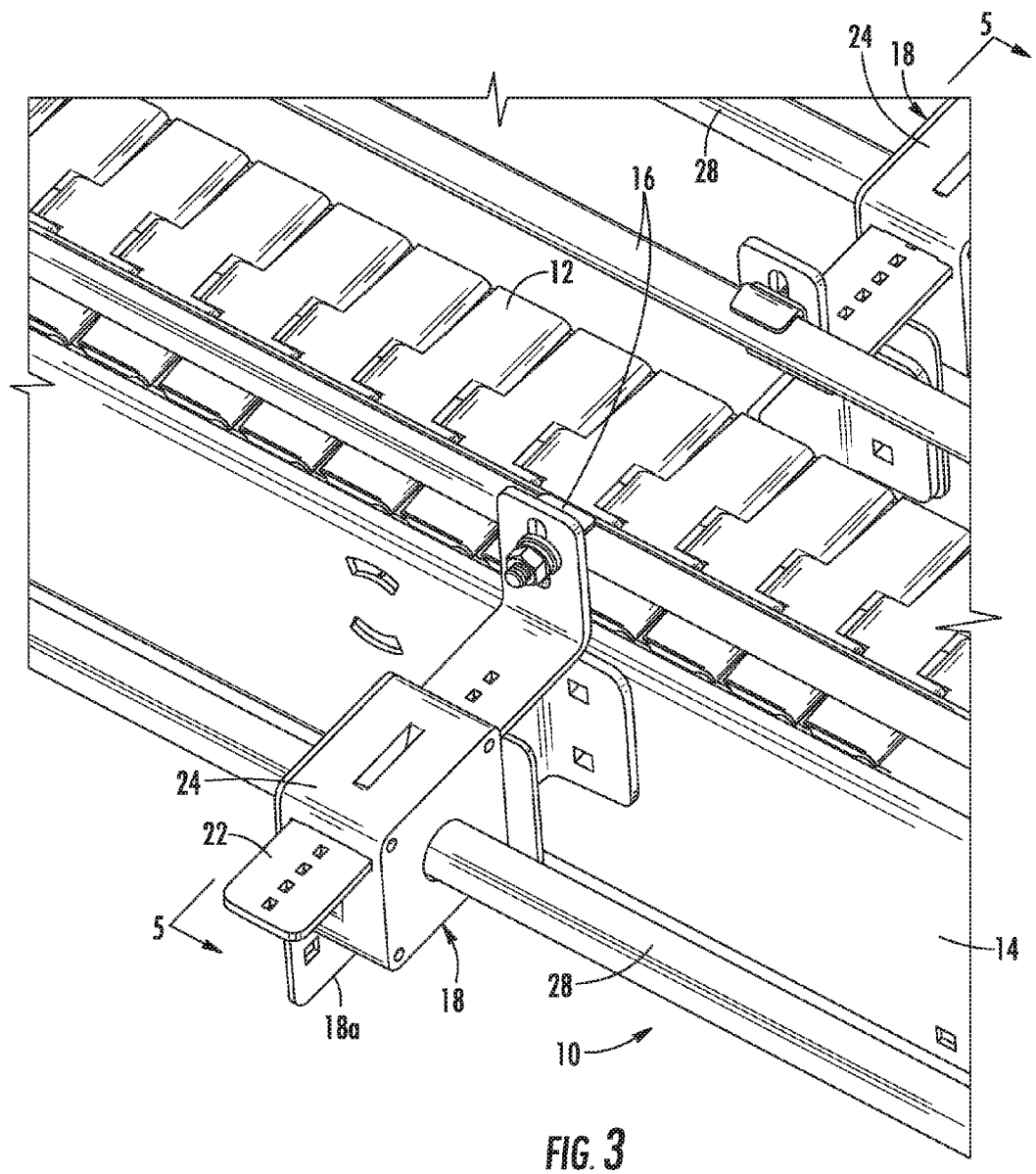
FIG. 3 is an enlarged perspective view of a section of the conveyor shown in FIG. 2, showing detail of the adjusters opposite each other.
Figure 4:
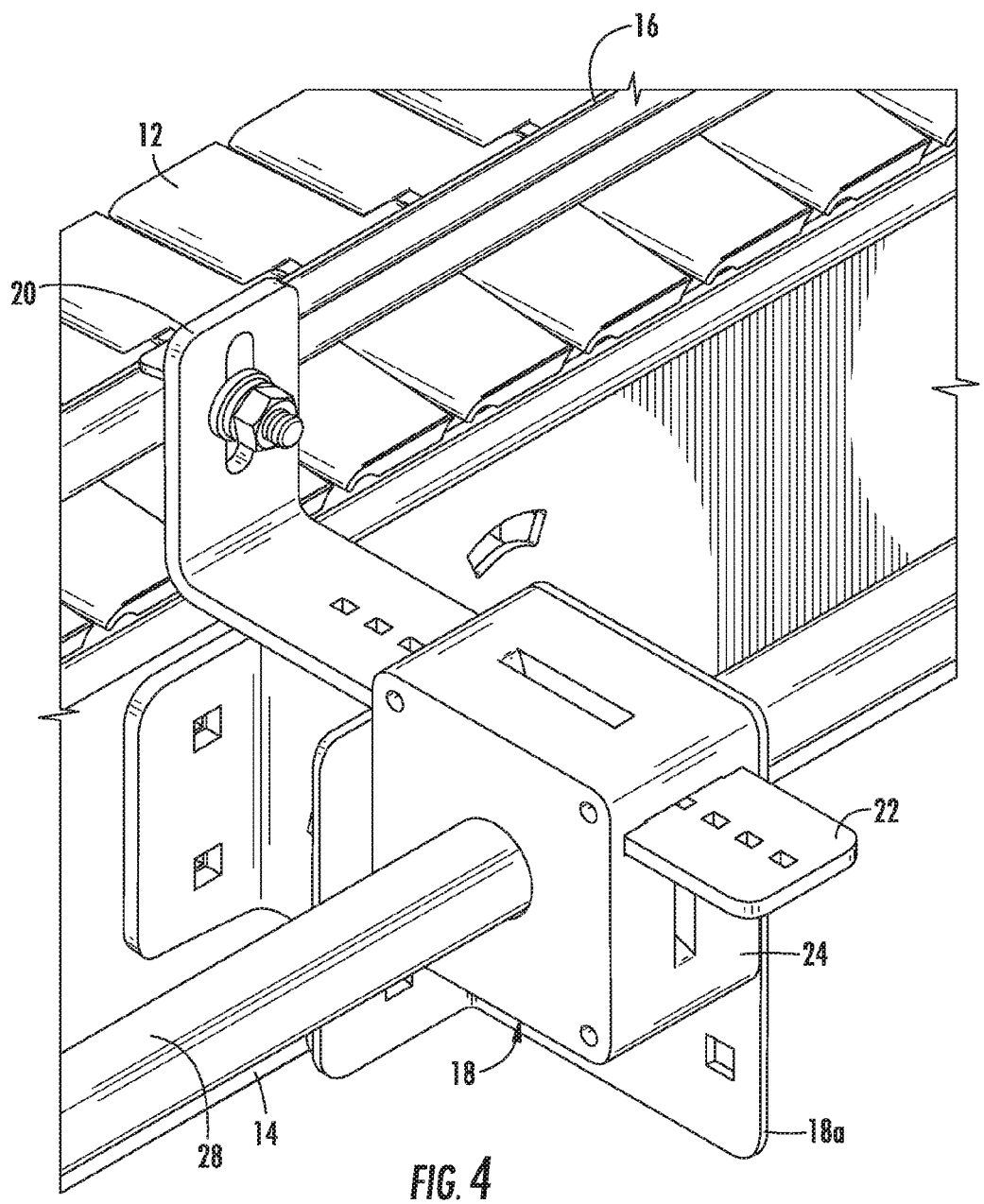
FIG. 4 is an enlarged perspective view of a section of the conveyor shown in FIG. 3, showing further detail of one of the adjusters.

The invention further provides a rotator 30 for rotating the synchronizing connectors 28 and pinions 26, so as to move the guide rail a desired amount. In FIGS. 1 and 2, the rotator 30 includes a crank handle 32 connected to a crankshaft 34. As shown most clearly in FIG. 2, in this embodiment the crankshaft 34 is oriented transverse to the synchronizing connectors 28, and so this embodiment includes a gear box or other transfer case 36, wherein the crankshaft 34 is the input shaft, and with the transfer case translating the rotational motion, the output shaft is connected to the nearest synchronizing connector(s) 28. The rotator 30 may take other forms as well, as will be explained below.

Figure 5A:
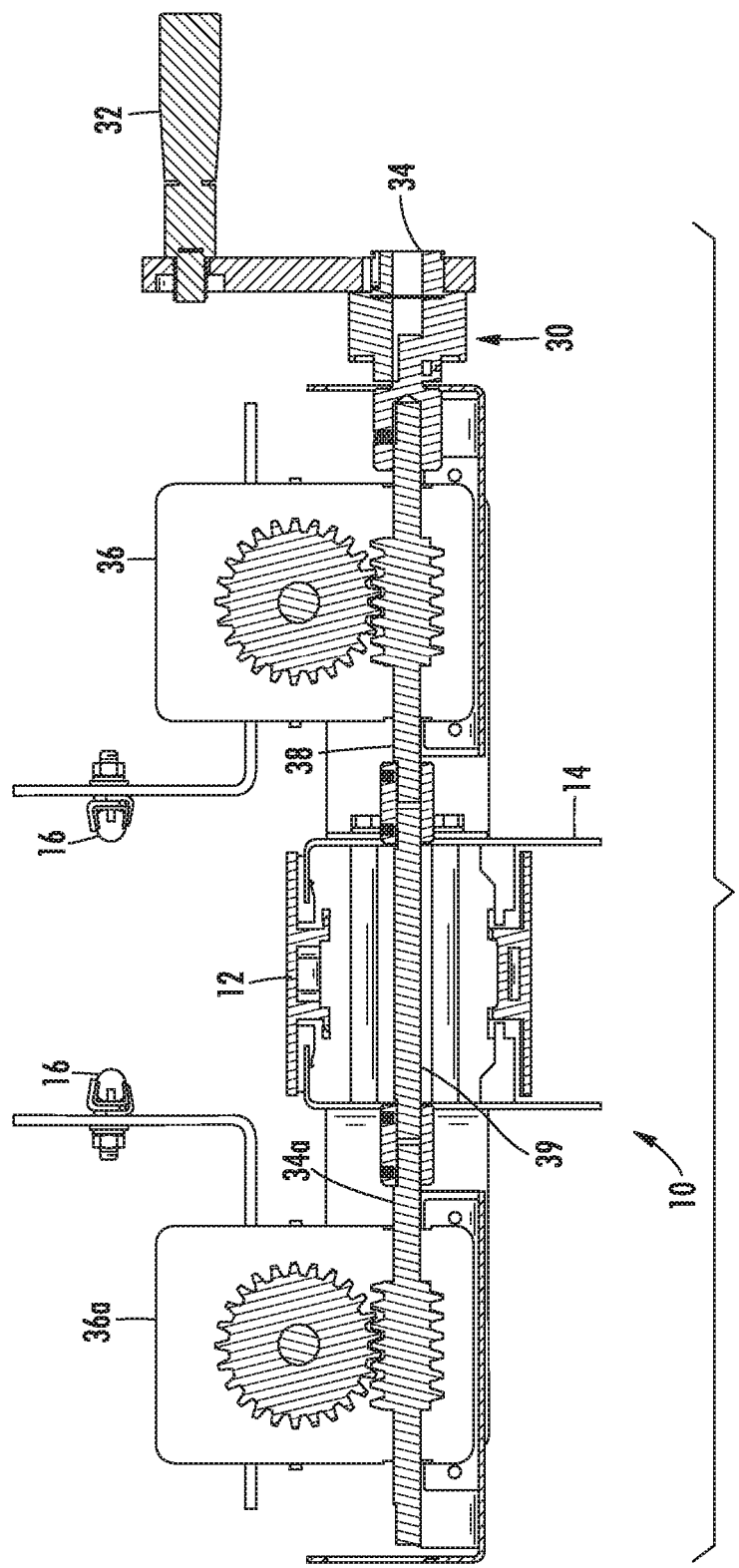
FIG. 5A is a cross sectional view of the conveyor shown in FIG. 2, taken along line 5A-5A.
Figure 6:
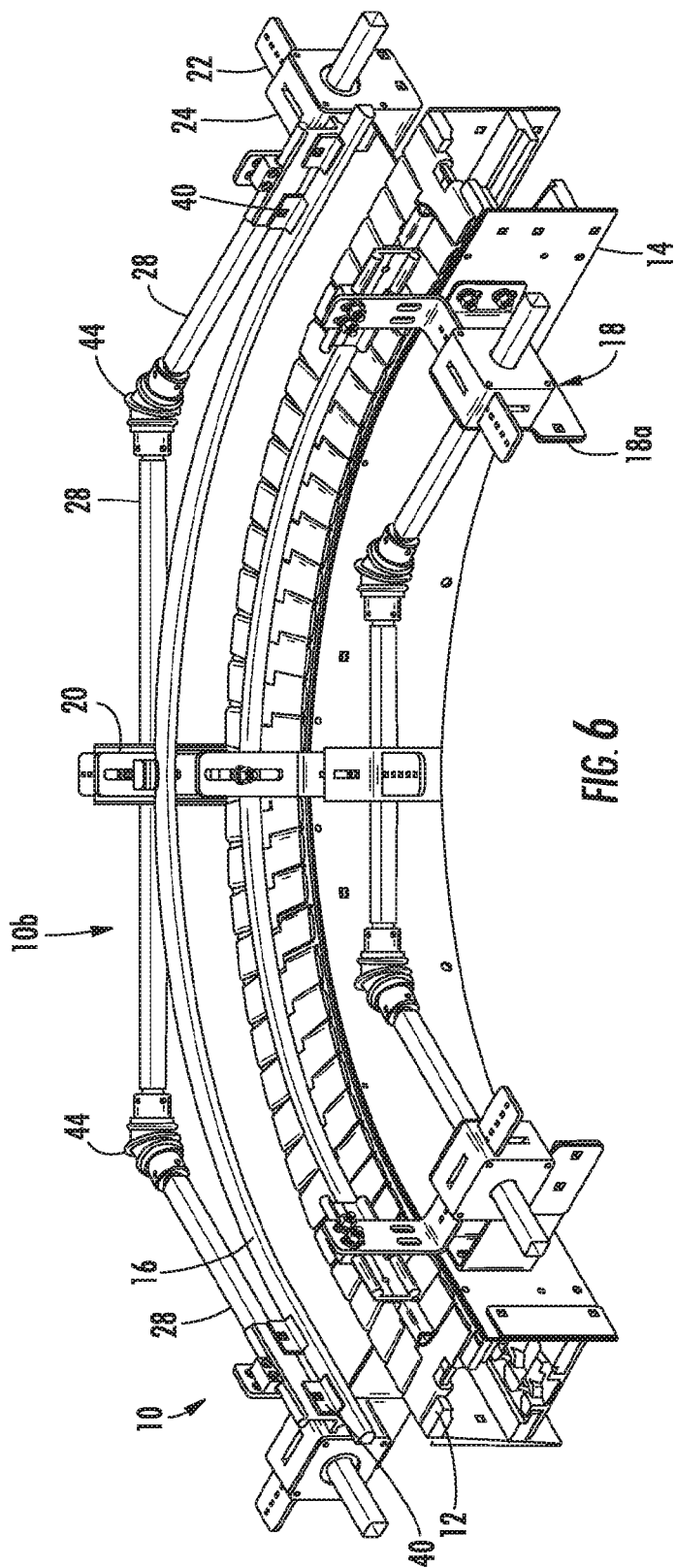
FIG. 6 is an enlarged perspective view of a curved portion of the conveyor shown in FIG. 1.
Figure 7:
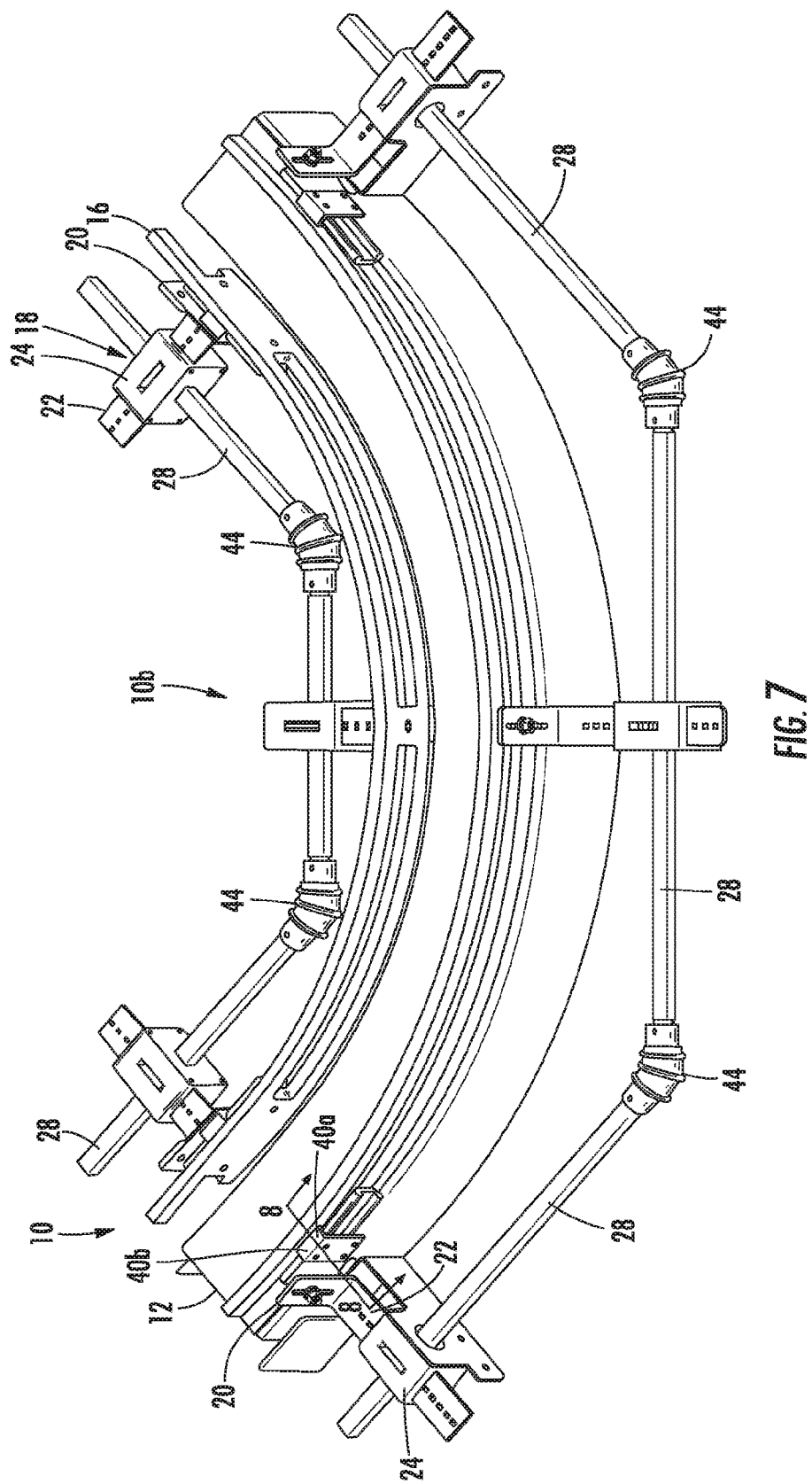
FIG. 7 is a perspective view of the curved portion of the conveyor shown in FIG. 6, from the opposite side.
Figure 8:
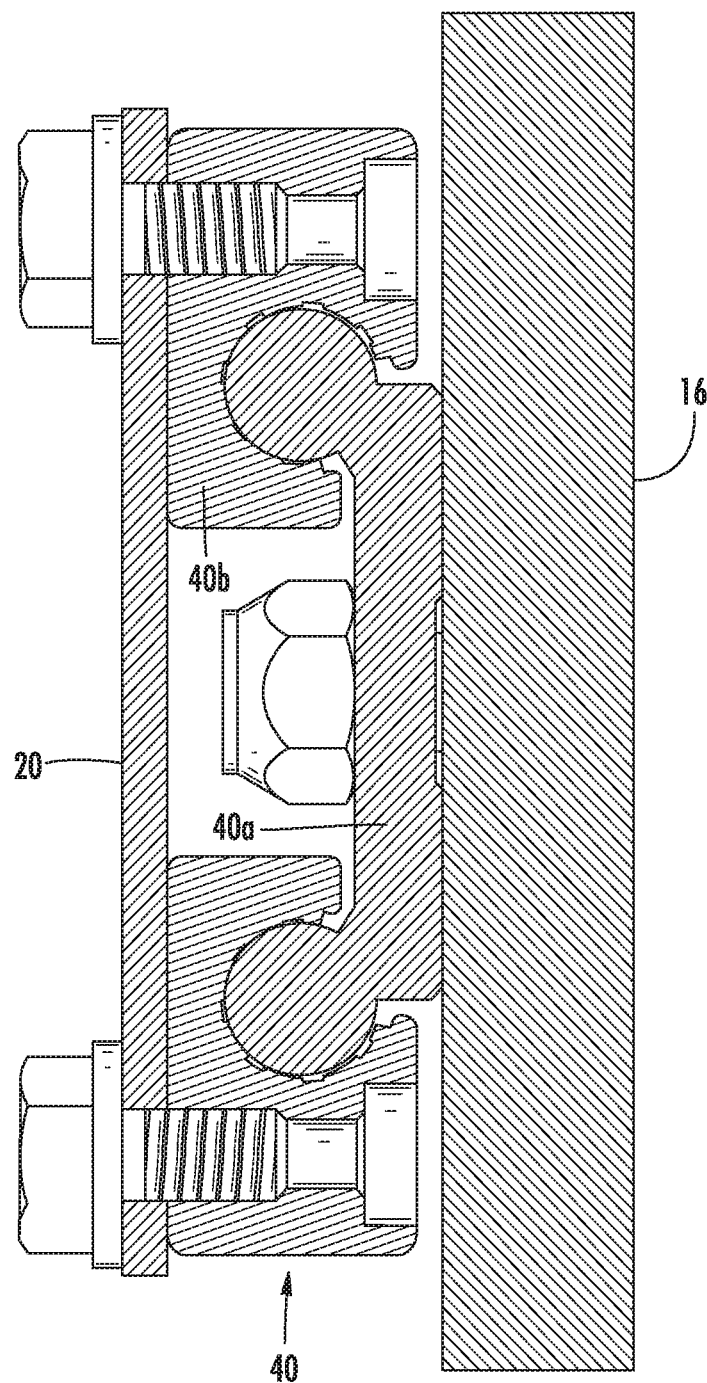
FIG. 8 is a cross sectional view of a portion of the conveyor shown in FIG. 8, taking along line 8-8.

It is common, though not required, for a conveyor 10 to have guide rails 16 on both sides. The present invention provides that the two guide rails 16 on the two opposite sides of the conveyor may have separate guide rail support systems, which could be separately adjustable, in the manner described above for a single side. The invention also provides for synchronizing the guide rail support systems of the two sides, if desired. According to the invention, as shown best in FIGS. 2 and 5A, the sides-synchronized version of the invention provides for an opposite transfer case 36a on the side of the conveying surface 12 opposite the transfer case 36. For this arrangement, transfer case 36 includes a second output shaft 38, which acts as, or connects to, the input shaft 34a of opposite transfer case 36a. In FIG. 5A, this connection is made by extender shaft 39, but other suitable connections may be supplied. As with transfer case 36, the output shaft of opposite transfer case 36a is connected to the synchronizing connectors 28 on that side of the conveyor 10. Thus, when the rotator 30 rotates the crankshaft 34 of the transfer case 36, the second output shaft 38 rotates the input shaft 34a of the opposite transfer case 36a, which causes the output shaft of opposite transfer case 36a to rotate the synchronizing connectors 28 on that side of the conveyor 10. In this fashion, both sides of guide rails 16 are moved at the same time.

As shown in FIG. 1, conveyor 10 may include a straight portion 10a, but it may also include a curved portion 10b. As shown in FIGS. 6, 7, 8, 9A and 9B, the invention also provides for supporting and adjusting the guide rail 16 in the curved portion 10b of the conveyor 10. As shown in those figures, at the center of the curve, the guide rail arm 20 is affixed to the guide rail 16 as described above. However, at each end of the curved section, the respective guide rail arm 20 is connected to the respective portion of the guide rail 16 by means of a slider assembly 40, which allows relative sliding lateral movement between the guide rail and the guide rail arm. As shown best in FIGS. 8, 9A and 9B, in this embodiment slider assembly 40 is formed of a rail portion 40a, connected to the guide rail 16, and an arm portion 40b connected to the guide rail arm 20. Rail portion 40a and arm portion 40b are connected together in a manner that permits them to slide with respect to each other, laterally, along the lengthwise direction of the guide rail 16.

Figure 9A:
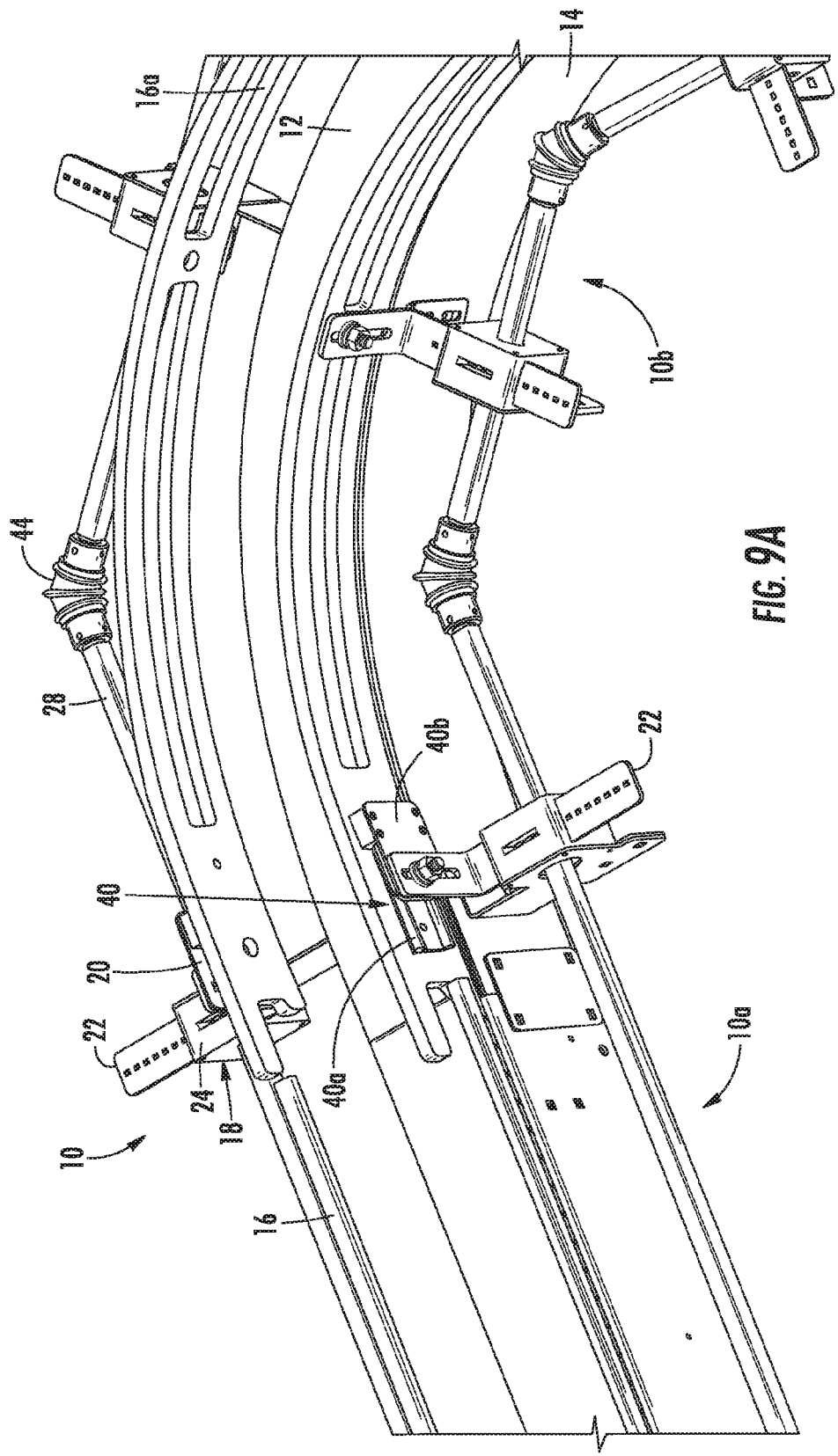
FIGS. 9A and 9B are enlarged perspective views of an area of the curved portion of the conveyor and an adjacent area of the straight portion of the conveyor, showing the detail of the sliding support.
Figure 9B:
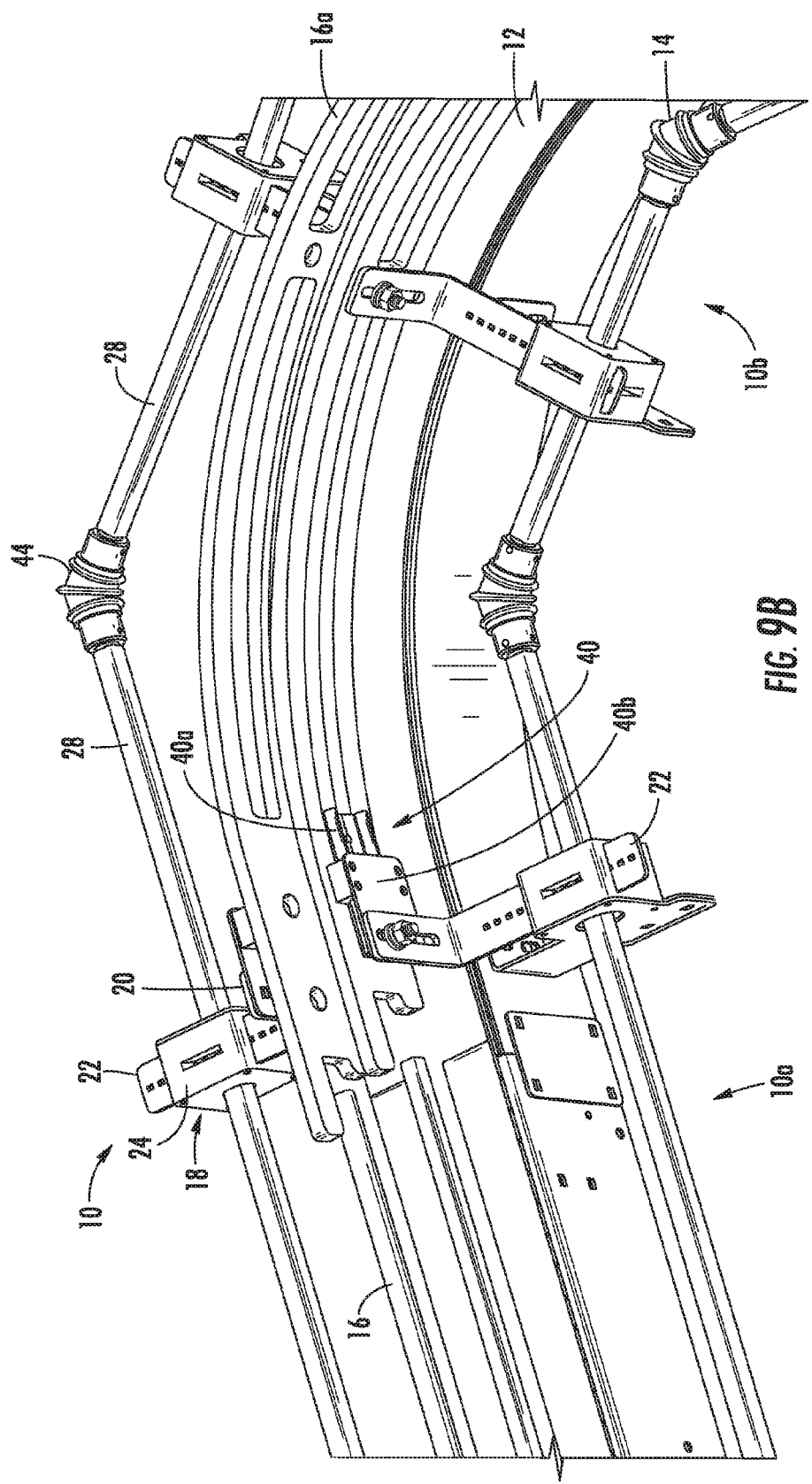

Thus, when guide rail arm 20 on the outside of the curve is moved away from the conveying surface 12 by the action of the synchronizing connectors 28 and pinion 26, the rail portion 40a slides along the arm portion 40b away toward the center point of the curve, as shown in FIG. 9A, whereas when guide rail arm 20 on the outside of the curve is moved toward the conveying surface 12 by the action of the synchronizing connectors 28 and pinion 26, the rail portion 40a slides along the arm portion 40b away from the center point of the curve, as shown in FIG. 9B. Conversely, when guide rail arm 20 on the inside of the curve is moved away from the conveying surface 12 by the action of the synchronizing connectors 28 and pinion 26, the rail portion 40a slides along the arm portion 40b away from the center point of the curve, again as shown in FIG. 9A, whereas when guide rail arm 20 on the inside of the curve is moved toward the conveying surface 12 by the action of the synchronizing connectors 28 and pinion 26, the rail portion 40a slides along the arm portion 40b toward the center point of the curve, again as shown in FIG. 9B.

In general, FIG. 9A shows the guide rails 16 and 16a in their widest position, and it can be seen that the guide rails 16 and 16a forming the outer side of the curve do not overlap each other, whereas the guide rails 16 and 16a forming the inner side of the curve do overlap to an extent. Conversely, FIG. 9B shows the guide rail 16 and 16a in their narrowed position, and it can be seen that the guide rails 16 and 16a forming the outer side of the curve do overlap each other to some extent, whereas the guide rails 16 and 16a forming the inner side of the curve do not overlap. The overlap described herein is permitted or accommodated in the embodiment shown, by the fact that the straight portion guide rail 16 is a single rail, at a level a bit lower (closer to the level of the conveying surface 12) than the curved portion guide rail 16a, so that the same distance from the opposing guide rail 16 or 16a is maintained by both straight guide rail 16 and curved guide rail 16a.

In connection with the curved portion 10b of the conveyor 10, the synchronizing connectors are provided with universal joints 44, or other suitable connectors, or flexible members may be used, to permit rotational forces to be transmitted to pinion blocks 24 around the curvature of the curved portion.

FIG. 10 shows an alternative embodiment of the invention. Where the embodiment shown in FIGS. 1 and 2 showed the rotator 30 to include a crank handle 32, the embodiment shown in FIG. 10 illustrates a rotator 30 that includes a motor 42. Operation of a motor to bring about a desired number of rotations, or a desired portion of a single rotation, is well known by persons of ordinary skill in the art. The motor 42 may be controlled locally, such as by an operator in the presence of the motor, or may be controlled remotely through a distributed control system.

FIGS. 11 and 12 show another alternative embodiment of the invention wherein the pinion blocks 24 are mounted in a guide support frame 46 above the conveyor surface 12, and wherein the guide rail adjustment rack 22 is mounted vertically within the pinion blocks, so that the adjustment permitted is vertical adjustment of the guide rail 16, higher or lower along the length of the conveyor surface 12.

FIG. 13 shows another alternative embodiment of the invention wherein, as alluded to above, the guide rail 16 may be mounted adjustably on one side of the conveying surface 12. On the opposite side of the conveying surface 12, the guide rail 16 is mounted by attaching a fixed position mount 48 directly to the frame 14. Fixed position mounts vary in design and shape, but in general are well known to persons of ordinary skill in the art.

Figure 14:
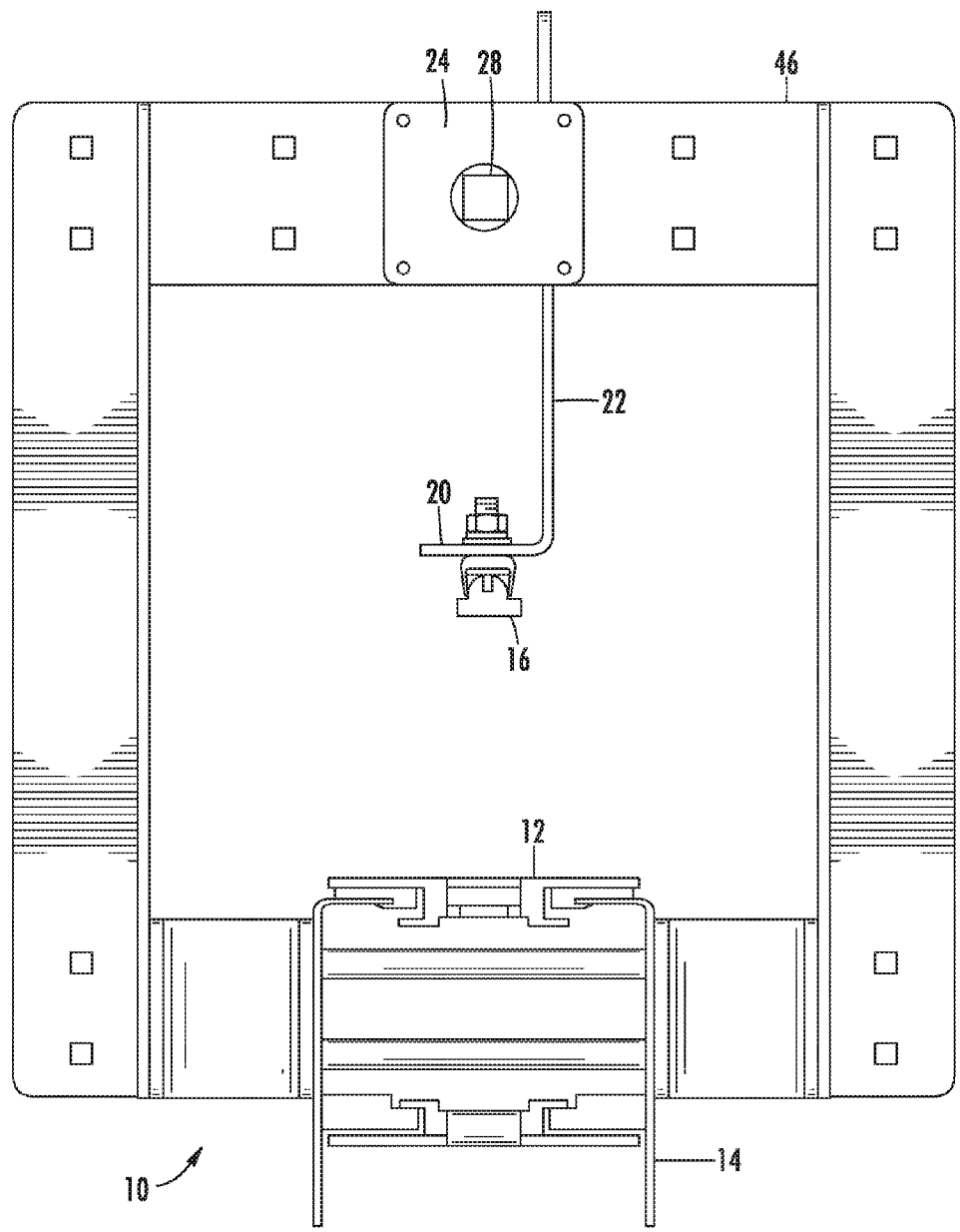
FIG. 14 is a cross sectional view of a conveyor constructed according to another alternative embodiment of the invention, wherein the guide rail is adjustable directly over the conveyor.

FIG. 14 shows an embodiment of the invention similar to that shown in FIGS. 11 and 12, in that the guide rail 16 is vertically adjustable. In this embodiment the guide rail 16 is positioned directly above the conveying surface 12, and can apply pressure downwardly onto items on the conveying surface.

Figure 15:
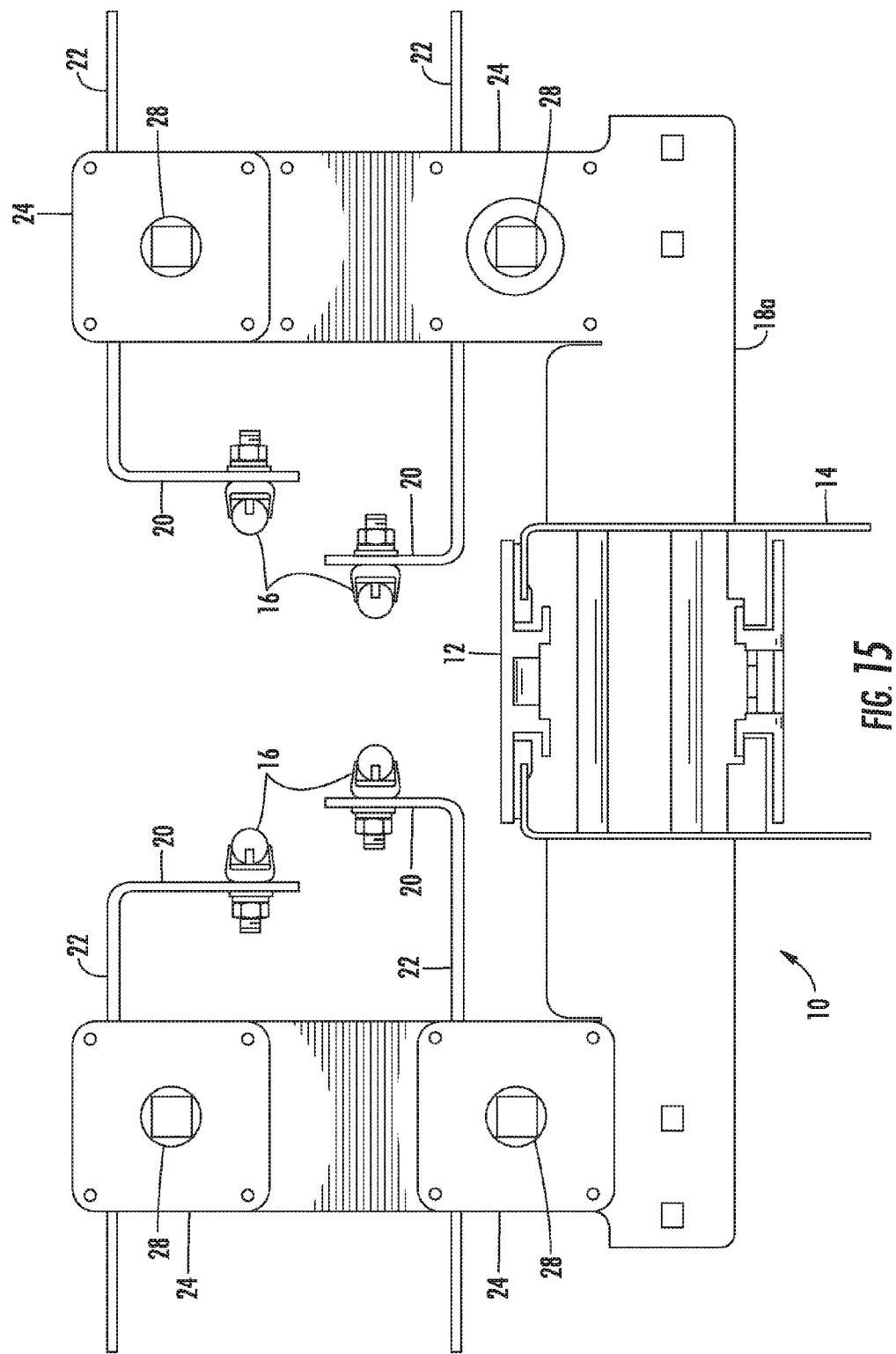
FIG. 15 is a cross sectional view of a conveyor constructed according to another alternative embodiment of the invention, including multiple adjustable guide rails on each side of the conveyor.

FIG. 15 shows an embodiment of the invention having multiple guide rails 16 on each side of the conveying surface 12. As can be seen, the upper and lower guide rails may be controlled separately from each other, and the respective opposing guide rails may be controlled together as described above.

Figure 16:
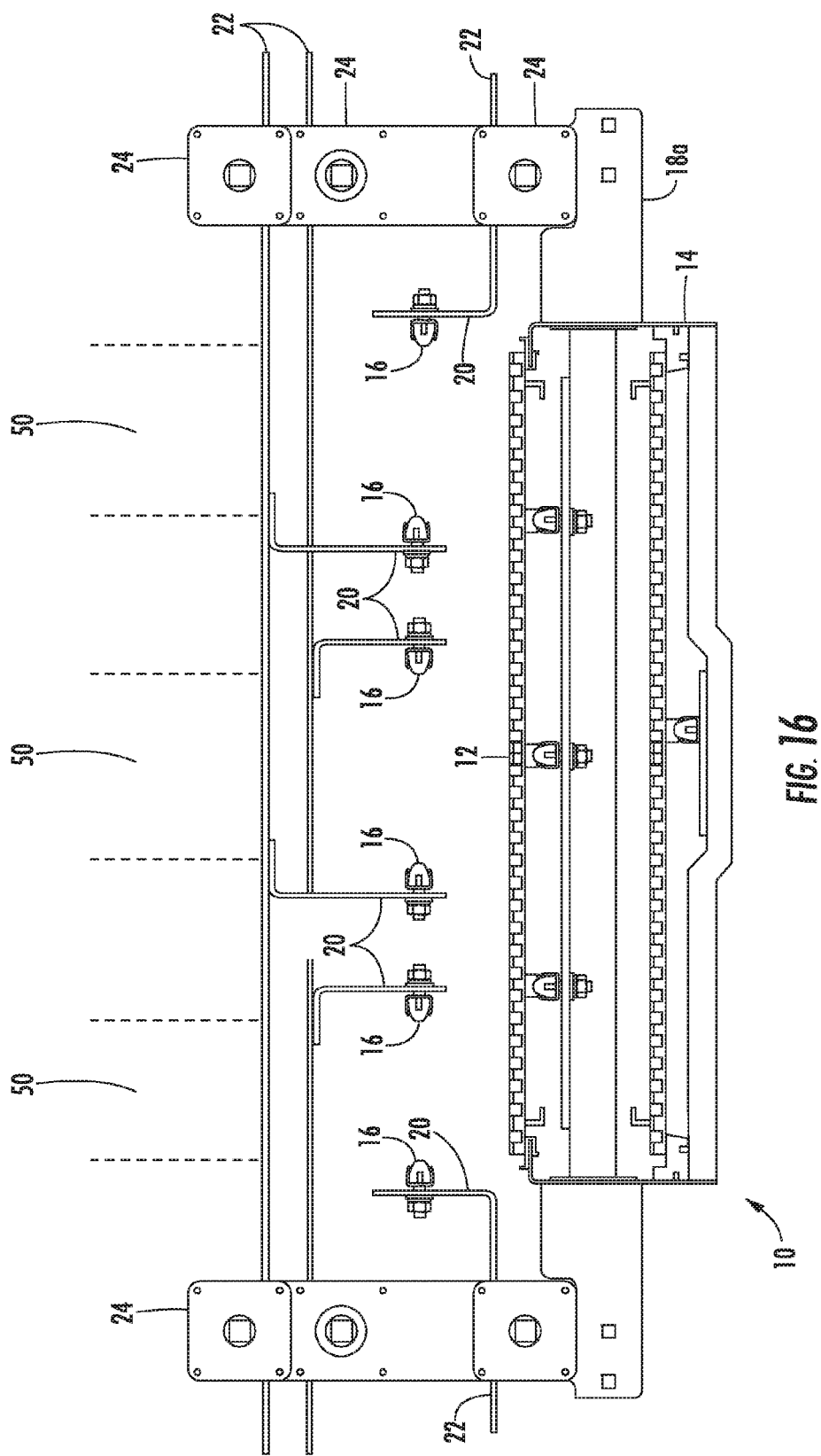
FIG. 16 is a cross sectional view of a conveyor constructed according to yet another alternative embodiment of the invention, including multiple adjustable guide rails sufficient to form multiple lanes on the conveyor.

FIG. 16 shows an embodiment of the invention having multiple adjustable guide rails 16 sufficient to form multiple lanes 50 on the conveying surface 12.

This invention has a number of advantages over prior art. First, the single piece turn rail minimizes catch points and is cleaner without overlapping multiple pieces. Second, there is a linear bearing/slide mechanism in the turn section to facilitate the change in radius and circumferential distance, while maintaining the desired rail gap. This invention permits the use of fewer actuation points per length of conveyor. The design is modular, and thus does not require custom engineering for turns. Some prior art conveyors require all turns to be specially engineered and designed by the manufacturer. In general, the design is cleaner. The housing can be flushed with water to clean the pinion and rack. The fact that the rack can be manufactured of multiple different materials, including steel, facilitates custom lengths and is less expensive to produce. Finally, the implementation of the non-round shaft eliminates need for set collars.

While the apparatus hereinbefore described is effectively adapted to fulfill its intended objects, it is to be understood that the invention is not intended to be limited to the specific preferred embodiments set forth above. Rather, it is to be taken as including all reasonable equivalents to the subject matter described.

We claim:
1. A conveyor system, comprising:
a conveyor frame;
a conveying surface, capable of moving along the conveyor frame;
a guide rail positioned alongside the conveying surface;
a guide rail support system to which the guide rail is connected, the guide rail support system including a plurality of guide rail adjustment assemblies, each guide rail adjustment assembly having:
a guide rail arm, to which the guide rail is mounted, the guide rail arm having an adjustment rack; and
a guide rail pinion engaged with the adjustment rack and positioned such that a rotation of the guide rail pinion causes the adjustment rack, and consequently the guide rail arm and in turn the guide rail itself, to move generally linearly, closer to and further away from a desired area of the conveying surface;
the guide rail support system further including a synchronizing connector connected to the guide rail pinions of two adjacent guide rail adjustment assemblies; and
a rotator connected to the synchronizing connector for rotating the synchronizing connector and thereby rotating the connected guide rail pinions;
wherein the conveyor includes a curved section, and wherein the synchronizing connector along the curved section is formed of two synchronizing connector sections, each formed of substantially rigid material, and each respectively connected to one of two adjacent guide rail adjustment assemblies along the curved section, the two synchronizing connector sections connected together by means of a universal joint, so as to transmit torsional forces along the curved section, and wherein the guide rail is mounted to the guide rail arm by means of a slider assembly, the slider assembly including a slider assembly rail portion non-slidably affixed to the guide rail, and a slider assembly arm portion non-slidably affixed to the guide rail arm, and wherein the slider assembly rail portion and the slider assembly arm portion are slidably connected together.

2. A conveyor system as recited in claim 1, wherein the synchronizing connector has a cross section that is substantially square.

3. A conveyor system as recited in claim 1, herein the conveying surface has two sides, a first side and a second side, and wherein the guide rail support system is positioned adjacent to the first side of the conveying surface, and further comprising:
a second guide rail support system positioned adjacent to the second side of the conveying surface, to which a second guide rail is connected, the second guide rail support system including a plurality of guide rail adjustment assemblies, each second guide rail adjustment assembly having:
a second guide rail arm; to which the guide rail is mounted, the second guide rail arm having a second adjustment rack; and a second guide rail pinion engaged with the second adjustment rack and positioned such that a rotation of the second guide rail pinion causes the second adjustment rack to move generally linearly, closer to and further away from a desired area of the conveying surface;

a second synchronizing connector connected to the second guide rail pinions of two second guide rail adjustment assemblies; and a second rotator connected to the second synchronizing connector for rotating the second synchronizing connector and thereby rotating the connected second guide rail pinions.

4. A conveyor system as recited in claim 1 wherein the rotator includes a crank handle.

5. A conveyor system as recited in claim 1 wherein the rotator includes a motor.

6. An adjustable guide rail system for use in connection with a conveying surface, having a curved path along at least a portion thereof, and capable of moving with respect to the guide rail system, the guide rail system comprising:

a guide rail positioned alongside a selected area of the conveying surface;

a guide rail support system to which the guide rail is connected, the guide rail support system including a plurality of guide rail adjustment assemblies, each guide rail adjustment assembly having:

a guide rail arm, to which the guide rail is mounted, the guide rail arm having an adjustment rack; and a guide rail pinion engaged with the adjustment rack and positioned such that a rotation of the guide rail pinion causes the adjustment rack, and consequently the guide rail arm and in turn the guide rail itself, to move generally linearly, closer to and further away from the selected area of the conveying surface;

the guide rail support system further including a synchronizing connector connected to the guide rail pinions of two guide rail adjustment assemblies; and a rotator connected to the synchronizing connector for rotating the synchronizing connector and thereby rotating the connected guide rail pinions;

wherein the synchronizing connector is formed of a substantially rigid material, acrd includes a universal joint within its length, so as to transmit torsional forces along the curved path, and wherein the wide rail is mounted to the guide rail arm by means of a slider assembly, the slider assembly including a rail portion connected to the guide rail, and an arm portion connected to the guide rail arm, and wherein the rail portion and the arm portion are slidably connected together to form the slider assembly.

7. An adjustable guide rail system as recited in claim 6, wherein the synchronizing connector has a cross section that is substantially square.

8. An adjustable guide rail system as recited in claim 6 wherein the rotator includes a crank handle.

9. An adjustable guide rail system as recited in claim 6 wherein the rotator includes a motor.

10. An adjustable guide rail support system for supporting a guide rail with respect to a conveying surface having a curved path along at least portion thereof, the guide rail support system comprising:

a plurality of guide rail adjustment assemblies, each guide rail adjustment assembly having a guide rail arm, to which the guide rail is mounted, the guide rail arm having an adjustment rack, and a guide rail pinion engaged with the adjustment rack and positioned such that a rotation of the guide rail pinion causes the adjustment rack, and consequently the guide rail arm and in turn the guide rail itself, to move generally linearly; closer to and further away from a desired area of the conveying surface;

a synchronizing connector connected to the guide rail pinions of two guide rail adjustment assemblies; and a rotator connected to the synchronizing connector for rotating the synchronizing connector and thereby rotating the connected guide rail pinions;

wherein the guide rail is mounted to the guide rail arm by means of a slider assembly, the slider assembly including a rail portion connected to the guide rail, and an arm portion connected to the guide rail arm, and wherein the rail portion and the arm portion are slidably connected together, and wherein the synchronizing connector is formed of a substantially rigid material, and includes a universal joint within its length, so as to transmit torsional forces along the curved path.

11. An adjustable guide rail support system as recited in claim 10, wherein the synchronizing connector has a cross section that is substantially square.

* * * * *